(12) United States Patent
Hager et al.

(10) Patent No.: US 6,492,459 B1
(45) Date of Patent: Dec. 10, 2002

(54) AQUEOUS CREAMS OF ORGANOSILICON COMPOUNDS

(75) Inventors: Rudolf Hager, Altötting (DE); Hans Mayer, Burghausen (DE); Marianne Kreuzpointner, Winhöring (DE); Sandra Huber, Tarsdorf (AT)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/889,688

(22) PCT Filed: Feb. 3, 2000

(86) PCT No.: PCT/EP00/00856
§ 371 (c)(1),
(2), (4) Date: Jul. 19, 2001

(87) PCT Pub. No.: WO00/46167
PCT Pub. Date: Aug. 10, 2000

(30) Foreign Application Priority Data

Feb. 4, 1999  (DE) ........................................ 199 04 496.1

(51) Int. Cl.[7] .............................. C08L 83/06; C08L 83/08
(52) U.S. Cl. ................ 524/838; 524/588; 524/837; 523/335; 516/55; 106/287.11; 106/287.16; 52/515; 52/517
(58) Field of Search ................................. 524/588, 837, 524/838; 523/335; 516/55; 106/287.11, 287.16; 52/515, 517

(56) References Cited

U.S. PATENT DOCUMENTS

| | | | |
|---|---|---|---|
| 4,076,868 A | | 2/1978 | Roth et al. |
| 4,661,551 A | * | 4/1987 | Mayer et al. ........... 106/287.11 |
| 4,757,106 A | * | 7/1988 | Mayer et al. ........... 106/287.11 |
| 5,104,447 A | | 4/1992 | Stewart et al. |
| 5,399,191 A | * | 3/1995 | Mayer et al. ........... 106/287.11 |
| 5,712,343 A | * | 1/1998 | Geck et al. ............. 106/287.14 |
| 5,962,585 A | | 10/1999 | Mayer et al. |
| 6,268,423 B1 | * | 7/2001 | Mayer et al. ................ 524/492 |
| 6,294,608 B1 | * | 9/2001 | Hager et al. ........... 106/287.11 |

FOREIGN PATENT DOCUMENTS

| | | |
|---|---|---|
| DE | 27 51 714 | 2/1979 |
| DE | 196 28 035 A1 | 1/1998 |
| EP | 0 819 665 A1 | 1/1998 |
| GB | 808193 | 1/1959 |
| GB | 962230 | 7/1964 |
| GB | 1 592 269 | 7/1981 |
| WO | WO 95/25706 | 9/1995 |
| WO | WO 96/29154 | 9/1996 |
| WO | WO 96/35652 | 11/1996 |

OTHER PUBLICATIONS

Derwent Abstract corresponding to EP–A 819,665 [AN 19898–101643].
Derwent Abstract corresponding to WO–A 96/27154 [AN 9629154].

* cited by examiner

*Primary Examiner*—Robert Dawson
*Assistant Examiner*—Jeffrey B. Robertson
(74) *Attorney, Agent, or Firm*—Brooks & Kushman P.C.

(57) ABSTRACT

The invention relates to a stable aqueous cream consisting of the following components: (A), which is selected from (A1) $C_1$–$C_{20}$-alkyl-$C_2$–$C_6$-alkoxysilanes and (A2) organopolysiloxane containing alkoxy groups; (C) an emulsifier; and (D) an organic solvent. The stable aqueous cream is suitable for the hydrophobic impregnation or priming of mineral building materials.

20 Claims, No Drawings

AQUEOUS CREAMS OF ORGANOSILICON COMPOUNDS

The invention relates to an aqueous firm cream and a process for impregnating or priming mineral building materials to impact water-repellency.

Organosilicon compounds are used in building protection especially owing to their outstanding impregnation effect for protection from water and dirt. Siliconates, silicone resins, monomeric silanes and oligomeric silanes have been established for years for this application. The active ingredients are usually dissolved or dispersed in low-viscosity carrier media, such as, for example, organic solvents or water. Low-viscosity active ingredients, such as, for example, monomeric silanes or low-viscosity mixtures of silanes and siloxanes, can also be applied undiluted to the building material.

A disadvantage of these impregnating compositions is that they readily run off or drip off vertical surfaces and very particularly during overhead work.

Silane-, siloxane- or silicone resin-based compositions containing mineral thickeners can on the other hand also be applied as a relatively thick layer to the building materials, without running off. The organosilicon compound penetrates into the building material and the thickener remains behind. U.S. Pat. No. 4,076,868 describes, for example, solutions of methylpolysiloxane in toluene which are thickened with silica. WO 95/25706 describes a process for imparting water-repellency with solvent-free silane/siloxane mixtures thickened with bentonites. The disadvantage of these processes is that the mineral thickener remains behind on the building material and has to be removed and disposed of.

In EP-A-819 665, these disadvantages are counteracted by using so-called water-repellent creams. These are aqueous, firm products based on organosilicon compounds, which are free of solids and organic solvents. The active ingredient content of these creams is preferably 60 to 95%.

On absorptive building materials, such as, for example, bricks, concrete, sand-lime bricks, fibre cement boards, mineral renders and many natural stones, impregnating compositions whose active ingredient content is frequently in the range of 5–25% are generally applied. For these applications, the active ingredient concentration of the water-repellent creams described in EP-A-819 665 is too high.

It was the object of the present invention to provide water-repellent creams whose application includes all advantages of the water-repellent creams of EP-A819 665 but whose active ingredient content can additionally be adjusted as desired.

The invention relates to an aqueous, firm cream which contains the components (A) which are selected from
   (A1) $C_1$–$C_{20}$-alkyl-$C_2$–$C_6$-alkoxysilanes and
   (A2) organopolysiloxane containing alkoxy groups,
(C) emulsifier and
(D) organic solvent.

In a preferred embodiment, the aqueous cream additionally contains a component (B) which contains aminoalkyl groups and is selected from alkoxysilane (B1) containing aminoalkyl groups or organopolysiloxane (B2) which, in addition to other organosiloxane units, contains those siloxane units which have radicals bonded via SiC and having basic nitrogen, with the proviso that the amine number of the organopolysiloxane (B2) is at least 0.01.

Pasty, water-containing formulations which are emulsion systems comprising water-immiscible oil phase, namely active ingredients (A) and optionally (B) plus organic solvents (D), water and emulsifiers (C), are designated as cream. The cream is considered to be firm if it can be applied by means of a doctor blade or brush or by spraying in a coat thickness of at least 0.5 mm to vertical absorptive mineral building materials, such as, for example, sand-lime brick or clay brick, and, after application, does not run down more than 1 cm before it has been completely absorbed by the building material.

Preferably, the $C_1$–$C_{20}$-alkyl-$C_2$–$C_6$-alkoxysilanes (A1) have 1 or 2 identical or different, optionally halogen-substituted monovalent $C_1$–$C_{20}$-alkyl radicals bonded via SiC, and the remaining radicals are identical or different $C_2$–$C_6$-alkoxy radicals. Methoxysilanes undergo hydrolysis too rapidly and prevent a sufficient shelf life.

Examples of the $C_1$–$C_{20}$-alkyl radicals are methyl, ethyl, n-propyl, isopropyl, n-butyl, isobutyl, tert-butyl, n-pentyl, isopentyl, neopentyl and tert-pentyl radicals; hexyl radicals, such as the n-hexyl radical; heptyl radicals, such as the n-heptyl radical; octyl radicals, such as the n-octyl radical, and isooctyl radicals, such as the 2,2,4-trimethylpentyl radical; nonyl radicals, such as the n-nonyl radical; decyl radicals, such as the n-decyl radical and dodecyl radicals, such as the n-dodecyl radical; cycloalkyl radicals, such as cyclopentyl, cyclohexyl, 4-ethylcyclohexyl and cycloheptyl radicals, norbornyl radicals and methylcyclohexyl radicals.

Examples of halogen-substituted $C_1$–$C_{20}$-alkyl radicals are alkyl radicals substituted by fluorine, chlorine, bromine and iodine atoms, such as the 3,3,3-trifluoro n-propyl radical, the 2,2,2,2',2',2'-hexafluoroiso-propyl radical and the heptafluoroisopropyl radical.

The unsubstituted $C_1$–$C_{12}$-alkyl radicals are particularly preferred.

Examples of $C_2$–$C_6$-alkoxy radicals are the ethoxy, n-propoxy, isopropoxy, n-butoxy, isobutoxy, sec-butoxy and tert-butoxy radicals; pentyloxy radicals, such as the n-pentyloxy radical, and hexyloxy radicals, such as the n-hexyloxy radical. The ethoxy radicals are particularly preferred.

The alkoxy radicals may be substituted by halogen atoms, but this is not preferred.

The aqueous cream may contain an organopolysiloxane (A2) containing alkoxy groups, or a mixture of several organopolysiloxanes. The organopolysiloxanes may additionally contain hydroxyl groups, which facilitate binding to the building materials.

The organopolysiloxanes (A2) preferably have a viscosity of not more than 2000 MPa.s, in order to achieve a particularly good distribution on the pore surfaces in the masonry. It is also possible to use organopolysiloxanes having a higher viscosity, including solid resins, e.g. solid methyl-silicone resins having a molecular weight of 2000 to 10,000 g/mol with, for example, a glass transition temperature range of 40–50° C., or solid resins comprising $R_3SiO_{0.5}$ and $SiO_2$ units (MQ resins) having a preferred ratio of $R_3SiO_{0.5}$ to $SiO_2$ of 0.4:1 to 1.2:1. These are preferably present in solution in silanes (A1) or in low-viscosity organopolysiloxanes (A2) or in the organic solvent (D).

The organopolysiloxanes (A2) comprising units of the general formula (I)

$$R_xSi(OR^1)_ySi(OH)_zO_{\frac{4-x-y-z}{2}} \quad (I)$$

in which
  R denote identical or different monovalent, optionally halogen-substituted $C_1$–$C_{20}$-hydrocarbon radicals bonded via SiC, $R^1$ denote identical or different monovalent $C_1$–$C_6$alkyl radicals, x denotes 0, 1, 2 or 3, on average 0.8 to 1.8, y denotes 0, 1, 2 or 3, on average 0.01 to 2.0, and z denotes 0, 1, 2 or 3, on average 0.0 to 0.5, with the proviso that the sum of x, y and z is not more than 3.5, are particularly suitable.

Examples of the $C_1$–$C_{20}$-hydrocarbon radicals are the $C_1$–$C_{20}$-alkyl radicals and halogen-substituted $C_1$–$C_{20}$-alkyl radicals mentioned above in the case of the organoalkoxysilanes (A1), the alkenyl radicals, such as the vinyl, allyl, n-5-hexenyl, 4-vinylcyclohexyl and 3-norbornenyl radicals; aryl radicals, such as the phenyl, biphenylyl, naphthyl, anthryl and phenanthryl radicals; alkaryl radicals, such as o-, m- and p-tolyl radicals, xylyl radicals and ethylpheyl radicals; aralkyl radicals, such as the benzyl radical, the alpha- and the β-phenylethyl radical. The unsubstituted $C_1$–$C_{12}$-alkyl radicals and the phenyl radical are particularly preferred.

Although not indicated in the abovementioned formula, some of the radicals R can be replaced by hydrogen atoms bonded directly to silicon atoms. However, this is not preferred.

Examples of the radicals $R^1$ are the methyl, ethyl, n-propyl, isopropyl, n-butyl, sec-butyl and tert-butyl radicals; pentyl radicals, such as the n-pentyl radical, and hexyl radicals, such as the n-hexyl radical, the methyl and ethyl radicals being particularly preferred.

Preferably, x has an average value of 0.9 to 1.2. Preferably, y has a value of 0.01 to 1.2. Preferably, z has an average value of 0.0 to 0.2.

Examples of organosiloxanes (A2) are those which are obtainable by reacting methyltrichlorosilane and optionally a $C_1$–$C_8$-alkyltrichlorosilane and optionally dimethyldichlorosilane or phenyltrichlorosilane with methanol or ethanol in water, such as the organopolysiloxanes of the empirical formulae $CH_3Si(OC_2H_5)_{0.8}O_{1.1}$, $C_6H_5Si(OC_2H_5)_{0.72}O_{1.14}$, $(CH_3)_{0.7}(iso\text{-}octyl)_{0.3}(OCH_3)_{0.6}SiO_{1.2}$, $CH_3(OC_2H_5)_{0.02}SiO_{1.49}$ or $(CH_3)_{1.2}(OC_2H_5)_{0.02}SiO_{1.39}$ The alkoxysilanes (B1) optionally used in addition to component (A) and containing aminoalkyl groups are preferably $C_1$–C6-alkoxysilanes (B1) and have in particular the general formula (II)

$$R^2_u R^3_v Si(OR^4)_{4-u-v} \quad (II),$$

in which $R^2$, $R^3$ and $R^4$ have the meanings mentioned below in the case of the general formula (III) and u is 0, 1 or 2 and v is 1, 2 or 3, with the proviso that the sum of u and v is less than or equal to 3.

An example of a preferred alkoxysilane (B1) is $H_2N(CH_2)_2NH(CH_2)_3$—$Si(OCH_3)_3$.

The organopolysiloxanes (B2) optionally used in addition to component (A) are preferably those comprising units of the general formula (III)

$$R^2_a R^3_b (OR^4)_c SiO_{\frac{4-a-b-c}{2}}, \quad (III)$$

in which $R^2$ denotes identical or different monovalent, optionally halogen-substituted, SiC-bonded $C_1$–$C_{20}$-hydrocarbon radicals free of basic nitrogen, $R^3$ denotes identical or different monovalent, optionally halogen-substituted, SiC-bonded $C_1$–$C_{30}$-hydrocarbon radicals having basic nitrogen, $R^4$ may be identical or different and denotes a hydrogen atom or $C_1$–$C_6$-alkyl radicals, a denotes 0, 1, 2 or 3, b denotes 0, 1, 2 or 3, on average at least 0.05, and c denotes 0, 1, 2 or 3, with the proviso that the sum of a, b and c is less than or equal to 3 and that the amine number of the organopolysiloxane (B2) is at least 0.01.

The amine number designates the number of ml of 1 N HCl which are required for neutralizing 1 g of organopolysiloxane (B2). The amine number of the organopolysiloxane (B2) is preferably at least 0.1, in particular at least 0.2, and preferably not more than 8, in particular not more than 4.

Examples and preferred examples of the radical $R^2$ are mentioned above in the case of radical R. In particular, the methyl and the isooctyl radical are preferred.

Preferably, a hydrocarbon radical, in particular a methyl radical, is also bonded to each silicon atom to which a hydrogen atom is bonded.

Radical $R^3$ is preferably a radical of the general formula (IV)

$$R^5_2 NR^6— \quad (IV),$$

in which $R^5$ may be identical or different and denotes hydrogen or a monovalent, optionally substituted $C_1$–$C_{10}$-hydrocarbon radical or $C_1$–$C_{10}$-amino-hydrocarbon radical and $R^6$ denotes a divalent $C_1$–$C_{15}$-hydrocarbon radical.

Examples of the radical $R^5$ are the examples of hydrocarbon radicals given for radical R, and hydrocarbon radicals substituted by amino groups, such as aminoalkyl radicals, the aminoethyl radical being particularly preferred.

Preferably, at least one hydrogen atom is bonded to each nitrogen atom in the radicals of the general formula (IV).

Radical $R^6$ is preferably a divalent hydrocarbon radical having 1 to 10 carbon atoms, particularly preferably 1 to 4 carbon atoms, in particular the n-propylene radical.

Examples of radical $R^6$ are the methylene, ethylene, propylene, butylene, cyclohexylene, octadecylene, phenylene and butenylene radical.

Preferred examples of radicals $R^3$ are $H_2N(CH_2)_3$—, $H_2N(CH_2)_2NH(CH_2)_2$—, $H_2N(CH_2)_2NH(CH_2)_3$—, $H_2N(CH_2)_2$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)_5$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$— and $(C_2H_5)_2N(CH_2)_2$—.

The examples of alkyl radicals $R^1$ are also fully applicable to the radical $R^6$.

Examples and preferred examples of the radical $R^4$ are mentioned above in the case of radical $R^1$. In particular, the methyl and the ethyl radical are preferred.

The preferred average value for a is 0 to 2, in particular 0 to 1.8.

The preferred average value for b is 0.1 to 0.6, in particular 0.15 to 0.30.

The preferred average value for c is 0 t6 0.8, in particular 0.01 to 0.6.

Preferably, the organopolysiloxanes (B2) have a viscosity of 5 to 5000, in particular of 100 to 3000, mPa.s at 25° C.

Organopolysiloxanes (B2) can be prepared in a known manner, for example by equilibration or condensation of silanes having amino functional groups with organpolysiloxanes which contain alkoxy groups and/or hydroxyl groups and which are free of basic nitrogen.

The aqueous creams contain an emulsifier (C) known per se.

Particularly suitable anionic emulsifiers are:
1. Alkylsulphates, particularly those having a chain length of 8 to 18 C atoms, alkyl- and alkaryether-sulphates having 8 to 18 C atoms in the hydrophobic radical and 1 to 14 ethylene oxide (EO) or propylene oxide (PO) units.
2. Sulphonates, in particular alkylsulphonates having 8 to 18 C atoms, alkylarylsulphonates having 8 to 18 C atoms, taurides, esters and monoesters of sulphosuccinic acid with monohydric alcohols or alkylphenols having 4 to 15 C atoms; these alcohols or alkylphenols may also be optionally ethoxylated with 1 to 40 EO units.
3. Alkali metal and ammonium salts of carboxylic acids having 8 to 20 C atoms in the alkyl, aryl, alkaryl or aralkyl radical.
4. Partial phosphoric acid esters and their alkali metal and ammonium salts, in particular alkyl and alkaryl phosphates having 8 to 20 C atoms in the organic radical, alkyl ether phosphates or alkaryl ether phosphates having 8 to 20 C atoms in the alkyl or alkaryl radical and 1 to 40 EO units.

Particularly suitable nonionic emulsifiers are:
5. Polyvinyl alcohol which also contains 5 to 50%, preferably 8 to 20%, of vinyl acetate units, having a degree of polymerization of 500 to 3000.
6. Alkyl polyglycol ethers, preferably those having 8 to 40 EO units and alkyl radicals of 8 to 20 C atoms.
7. Alkylaryl polyglycol ethers, preferably those having 8 to 40 EO units and 8 to 20 C atoms in the alkyl and aryl radicals.
8. Ethylene oxide/propylene oxide (EO/PO) block copolymers, preferably those having 8 to 40 EO and PO units.
9. Adducts of alkylamines having alkyl radicals of 8 to 22 C atoms with ethylene oxide or propylene oxide.
10. Fatty acids having 6 to 24 C atoms.
11. Alkylpolyglycosides of the general formula with the proviso that the sum of u and v is less than or equal to 3. R—O—$Z_o$, in which R* denotes a linear or branched, saturated or unsaturated alkyl radical having on average 8 to 24 C atoms and $Z_o$ denotes an oligoglycoside radical with on average O=1–10 hexose or pentose units or mixtures thereof.
12. Natural substances and their derivatives, such as lecithin, lanolin, saponins, cellulose; cellulose alkyl ethers and carboxyalkylceluloses whose alkyl groups each have up to 4 carbon atoms.
13. Linear organo(poly)siloxanes containing polar groups, in particular those having alkoxy groups of up to 24 C atoms and/or up to 40 EO and/or PO groups.

Particularly suitable cationic emulsifiers are:
14. Salts of primary, secondary and tertiary fatty amines having 8 to 24 C atoms with acetic acid, sulphuric acid, hydrochloric acid or phosphoric acids.
15. Quaternary alkyl- and alkylbenzeneammonium salts, in particular those whose alkyl groups have 6 to 24 C atoms, in particular the halides, sulphates, phosphates and acetates.
16. Alkylpyridinium, alkylimidazolinium and alkyloxazolinium salts, in particular those whose alkyl chain has up to 18 C atoms, especially the halides, sulphates, phosphates and acetates.

Particularly suitable ampholytic emulsifiers are:
17. Amino acids having long-chain substituents, such as N-alkyldi(aminoethyl)glycine or salts of N-alkyl-2-aminopropionic acid.
18. Betaines, such as N-(3-acylamidopropyl)-N,N-dimethylammonium salts having a $C_8$–$C_{18}$-acyl radical and alkylimidazolium betaines.

Preferred emulsifiers are nonionic emulsifiers, in particular the alkyl polyglycol ethers mentioned above under 6., the adducts of alkylamines with ethylene oxide or propylene oxide which are mentioned under 9., the alkylpolyglycosides mentioned under 11. and the polyvinyl alcohol mentioned under 5. Particularly preferred polyvinyl alcohols still contain 5 to 20%, in particular 10 to 15%, of vinyl acetate units and preferably have a degree of polymerization of 500 to 3000, in particular of 1200 to 2000.

In order to establish any desired active ingredient content, the aqueous creams contain, as component (D), a water-immiscible organic solvent which preferably has a solubility of at most less than 1% by weight in water at 20° C. and preferably has a boiling point of 60 to 280° C. Suitable organic solvents (D) are, for example, alkanes having boiling points preferably in the range from 60 to 280° C., particularly preferably 90 to 220° C., aromatic hydrocarbons, such as toluene, xylenes, trimethylbenzenes and tetramethylbenzenes, chloro-hydrocarbons, such as trichloroethylene or 1,1,1-trichloropropane, ketones, esters, such as n- or tert-butyl acetate, relatively long-chain alcohols, such as hexanols, heptanols or octanols, and relatively long-chain ethers, such as di-n-octyl ether. Owing to their low odour, alkanes, dearomatized or petroleum hydrocarbons and isoparaffins having boiling points in the range from 100 to 220° C. are particularly preferred.

The water-repellent creams described in EP-A-819 665 also have the disadvantage that, particularly in the case of very absorptive building materials of low alkalinity, such as, for example, clay bricks, poor water-repellency is produced directly at the surface of the building material.

The aqueous creams according to the invention may contain, as an additive, finely divided silicas (E) which have been rendered water-repellent and which further improve the water-repellency of the surfaces, also of absorptive surfaces of low alkalinity. In fact, the silicas (E) accumulate at the surface of the building material. In this way, considerable water-repellency is obtained very rapidly after impregnation. Suitable silicas (E) are obtainable, for example, if silica obtained by flame hydrolysis or precipitation is rendered water-repellent with organosilicon compounds, in particular silanes. The silicas (E) preferably have a specific surface area of at least 40 m²/g, particularly preferably at least 60 m²/g.

Hydrophobic solids cannot be emulsified in the water-repellent creams disclosed in EP-A-819 665, since the creamy consistency is destroyed as a result.

The total amount of the active ingredient components (A) and (B) in the aqueous creams is preferably 1 to 80% by weight, in particular 2 to 70% by weight.

The amount of the component (B) in the aqueous creams is preferably 0.1 to 20% by weight, in particular 0.2 to 10% by weight.

The amount of the emulsifier (C) in the aqueous creams is preferably 0.1 to 10% by weight, in particular 0.2 to 5% by weight.

The content of organic solvent (D) in the aqueous cream is preferably 1 to 95% by weight, in particular 5 to 80% by weight.

The content of silicas (E) in the aqueous creams is preferably 0.01 to 4% by weight, in particular 0.01 to 2% by weight.

The aqueous creams may also contain buffer substances which stabilize the pH in the range from 5 to 8, in which the alkyltrialkoxysilanes are very resistant to hydrolysis. All organic and inorganic acids and bases which are chemically inert to the other components of the emulsions, in particular the alkali metal, alkaline earth metal and ammonium salts of carboxylic acids, phosphoric acid, carbonic acid and sulphuric acid, are suitable. Sodium carbonate, sodium bicarbonate, sodium hydrogen phosphate and a mixture of acetic acid and aqueous ammonia solution are particularly preferred. The amount of buffer substances is preferably not more than 3, in particular 1, % by weight of the total amount of the creams.

The aqueous creams may also contain additives for improving the water-repellency, for example metal soaps, such as stearates or oleates.

In addition to the components described above, the aqueous creams may contain fungicides, bactericides, algicides, microbicides, odour substances, corrosion inhibitors and antifoams as additives. The preferred amount of additives is not more than 2, in particular 0.5, % by weight of the total amount of the creams.

The aqueous creams are prepared by conventional methods for the preparation of aqueous creams.

For this purpose, one possibility is initially to prepare a cream from the components (A), (B) and (C) by a process described in EP-A-819 665. Organic solvent (D) is then stirred into said cream in an amount sufficient to give the desired active ingredient content.

In a further preferred process, the components (A), (B) and (D) are premixed and are slowly emulsified in the aqueous solution of the emulsifier (C) until a creamy consistency is achieved.

Also preferred is a process in which the components (A) and (B) are premixed with only some of the total amount of the component (C) and emulsified in the water-emulsifier mixture until a creamy consistency is obtained. Finally, the amount of solvent (D) still remaining is then stirred into the creamy emulsion.

If solid resins comprising $R_3SiO_{0.5}$ and $SiO_2$ units are used, these are dissolved in the silanes (A1) or in the solvent (D) before preparation of the cream according to the invention.

The preparation of the aqueous creams according to the invention is preferably carried out in pressure emulsifiers, colloid mills or in particular in a high-speed stator-rotor stirring apparatus according to Prof. P. Willems. If a further solvent (D) is added to a cream which has already been prepared, said solvent is preferably stirred in without extreme application of shear force, in order to avoid destroying the stiff emulsion phase producing the creamy consistency.

The aqueous creams are particularly suitable for the water-repellent impregnation and priming of mineral building materials, such as natural or artificial stone, concrete and reinforced concrete, cellular concrete, sand-lime bricks, clay bricks, clinker, marble or granite.

The aqueous creams are particularly suitable for imparting water-repellency to mineral-bound, preferably cement-bound, fibre building materials whose fibres consist of natural fibres or manmade fibres. Suitable natural fibres are mineral fibres, such as rock wool, quartz fibres or ceramic fibres, or vegetable fibres, such as cellulose. Suitable manmade fibres are, for example, glass fibres, plastics fibres and carbon fibres. The use of the aqueous cream for imparting water-repellency to cement-bound cellulose fibre components is particularly preferred. The cellulose fibres may be, for example, jute, coconut or hemp fibres or may originate from paper, cardboard or waste paper.

The aqueous creams are preferably applied to the building material by spraying, brushing, rolling or trowelling. The coat thickness is preferably 0.05 to 3 mm, particularly preferably 0.1 to 2 mm.

In the following examples, all stated parts and percentages relate to weight, unless stated otherwise. Unless stated otherwise, the following examples are carried out at a pressure of the ambient atmosphere, i.e. at about 0.10 MPa, and at room temperature, i.e. at about 20° C., or at a temperature which is established on combining the reactants at room temperature without additional heating or cooling. The active ingredient content of the aqueous creams is defined as the sum of all organosilicon components.

EXAMPLES

The Following are used as Component (A):

H1: Isooctyltriethoxysilane

H2: Organopolysiloxane of the empirical formula $CH_3Si(OC_2H_5)_{0.8}O_{1.1}$ having an average molecular weight of about 650 g/mol and a viscosity of about 20 mm²/s.

H3: Methylsilicone resin present as a highly viscous liquid and comprising $CH_3SiO_{3/2}$ units, with about 20 mol % of $(CH_3)SiO_{2/2}$ units and about 5 mol % of $C_2H_5O/SiO_{3/2}$ units and a molecular weight of about 5000 g/mol.

The Following are Optionally used as Component (B):

N1: Condensate of an α,ω-dihydroxymethylpolysiloxane having an Si-bonded hydroxyl group in each of the terminal units and N-(2-aminoethyl)-3-aminopropyltrimethoxysilane in the presence of KOH, having an amine number of about 0.3, a viscosity of about 1500 mm²/s at 25° C. and a residual methoxy content of less than 5 mol %, based on the methoxy groups initially present in the N-(2-aminoethyl)-3-aminopropyltrimethoxysilane.

N2: N-(2-Aminoethyl)-3-aminopropyltrimethoxysilane

The Following are used as Component (C):

E1: Reaction product of stearylamine and ethylene oxide, having an alkali number of 48 to 51 mg KOH/g.

E2: Isotridecyl alcohol glycol ether having 10 ethylene oxide units, 80% strength in water.

The Following are used as Component (D):

LM1: Mineral spirit crystal oil K30 (Deutsche Shell Chemie GmbH)

LM2: Isoparaffin ISOPAR® H (Deutsche Exxon Chemical GmbH)

Example 1

1.6 g each of emulsifier E1 and E2 are mixed with 30.4 g of water, and 34 g of component N1 are then incorporated by emulsification in a high-speed stator/rotor stirring apparatus. 306 g of silane H1 and 26.4 g of water are then incorporated, alternately in 6 portions, in a high-speed stator/rotor stirring apparatus into the emulsion thus obtained, until a white, aqueous cream is obtained. This cream is then divided into two equal portions. 140 g of mineral spirit LM1 are stirred into one portion without significant introduction of shear forces (→Cream 1: 50% of active ingredient), and 650 g of LM1 are stirred into the other portion (→Cream 2: 20% of active ingredient).

Example 2

2 g of emulsifier E2 are mixed with 79.5 g of water, 2 g of component N2 and 0.5 g of acetic acid. 300 g of isoparaffin LM2 are then emulsified in this mixture in a high-speed stator/rotor stirring apparatus, the emulsion thus obtained already having considerable thickness. 384 g of a prepared mixture of 67 parts by weight of silane H1, 7 parts by weight of organopolysiloxane H2 and 26 parts by weight of silicone resin H3 are then emulsified in portions in this already stiff phase (→Cream 3: 50% of active ingredient).

Example 3

Example 2 is repeated, except that 600 g of isoparaffin LM2 and only 77 g of the active ingredient mixture comprising 67 parts by weight of silane Hi, 7 parts by weight of organopolysiloxane H2 and 26 parts by weight of silicone resin H3 are used (→Cream 4: 10% active ingredient content).

Silicone Pastes and Cream for Comparative Experiments

Paste 1: 340 g of silane H1 are diluted with 280 g of solvent LM1 and then mixed with 48 g of bentonite (Bentone® 34) and 12 g of ethanol with the aid of a low-speed stirrer until a relatively highly viscous, ochre-coloured paste results (→Paste 1: 50% active ingredient content).

Paste 2: 80 g of the prepared active ingredient mixture from Example 2, consisting of 67 parts by weight of silane H1, 7 parts by weight of organopolysiloxane H2 and 26 parts by weight of silicone resin H3, are diluted with 680 g of solvent LM2. 40 g of a hydrophobic pyrogenic silica (surface occupied by trimethylsiloxy group; specific surface area: 130 g/m$^2$) are then stirred into this solution, a pasty consistency being obtained (→Paste 2: 10% active ingredient content).

Cream 5: 1.6 g each of emulsifier E1 and E2 are mixed with 57 g of water, and 34 g of component N1 are then incorporated by emulsification in a high-speed stator/rotor stirring apparatus. 306 g of silane H1 and 26.4 g of water are then incorporated, alternately in 6 portions, in a high-speed stator/rotor stirring apparatus into the emulsion thus obtained, until a white, aqueous cream is obtained (→Cream 5: 80% active ingredient content, solvent-free).

Example 4 (Shelf-Life of the Creams According to the Invention)

None of the creams according to the invention from Examples 1–3 shows any optical change either after storage for 14 days at 50° C. or after 6 months at room temperature. They thus have a long shelf life. In the case of the comparative products Paste 1 and Paste 2, on the other hand, there is a substantial separation of clear liquid both at 50° C. and at room temperature.

Example 5 (Imparting Water-Repellency to Lime-Sand Brick)

Creams 1 to 4 according to the invention and Pastes 1 and 2 not according to the invention are applied with a brush to sand-lime slabs (about 10×10×2.5 cm$^3$). The amount applied is about 300 g/m$^2$. After storage for 14 days at room temperature, the surface of the test specimen is visually assessed, after which the specimens and untreated reference test specimens are placed in water (submerged in water to a depth of 5 cm) and their water absorption is determined as relative weight increase after 24 hours. The test specimens are then dried and broken, and the thickness of the hydrophobic zone (equal to the depth of penetration of the water-repellent active ingredients) is determined by dripping water on the fracture surface. By measuring the contact angle of water dripped on, the water-repellency is assessed. Contact angles of >90° denote good water-repellency, and those of <90° indicate wetting and thus represent fairly poor water-repellency. The results of these tests are summarized in Table I.

TABLE I

| Product | Water absorption | Depth of penetration | Water-repellency | Contact angle | Surface change |
|---|---|---|---|---|---|
| Cream 1 | 0.9% | >10 mm | Good | 110° | None |
| Cream 2 | 1.0% | 6–8 mm | Good | 115° | None |
| Cream 3 | 0.7% | >10 mm | Very good | 130° | None |
| Cream 4 | 0.8% | 5–7 mm | Very good | 135° | None |
| Paste 1 | 1.2% | >10 mm | Poor | 30° | Brown, loam-like |
| Paste 2 | 1.0% | 3–6 mm | Very good | 135° | White coating |
| Untreated | 12.3% | — | — | — | — |

As is evident from Table I, all products lead to a dramatic reduction in the capillary water absorption. With the exception of paste 1, good water-repellency is also achieved throughout. While the creams according to the invention do not change the appearance of the slabs, the comparative pastes Paste 1 and Paste 2 result in substantial changes.

Example 6 (Imparting Water-Repellency to Clay Bricks)

Creams 1 to 4 according to the invention and Pastes 1 and 2 prepared for comparative purposes and Cream 5 are applied to clay brick (about 22×10×7 cm$^3$) by means of a brush in an amount of about 500 g/m$^2$. After a drying time of 14 days, water absorption, water-repellency and contact angle, depth of penetration and surface change are determined analogously to Example 5. The results of these tests are summarized in Table II.

TABLE II

| Product | Water absorption | Depth of penetration | Water-repellency | Contact angle | Surface change |
|---|---|---|---|---|---|
| Cream 1 | 0.5% | >50 mm | Good | 110° | None |
| Cream 2 | 0.7% | 22–28 mm | Good | 115° | None |

TABLE II-continued

| Product | Water absorption | Depth of penetration | Water-repellency | Contact angle | Surface change |
|---|---|---|---|---|---|
| Cream 3 | 0.3% | >50 mm | Very good | 125° | Slight deepening of colour |
| Cream 4 | 0.6% | 17–23 mm | Very good | 135° | None |
| Paste 1 | 7.5% | >50 mm | None | <10° | Dark, loam-like |
| Paste 2 | 2.3% | 15–20 mm | Good | 110° | White coating |
| Cream 5 | 0.9% | >50 mm | Poor | <30° | None |
| Untreated | 17.6% | — | — | — | — |

The creams according to the invention all have an outstanding water-repellent effect and, with the exception of Cream 3, furthermore do not lead to any deepening of colour. The slight deepening of colour with Cream 3 is due to the high active ingredient content of this cream in combination with a high polysiloxane content.

Comparative pastes 1 and 2 change the appearance of the bricks considerably. Since they are free of water, the reaction to give the hydrophobic, polymeric active ingredient on the nonalkaline bricks takes a very long time, resulting in the evaporation of considerable amounts of the volatile active components. In the case of the silane-rich product Paste 1, there is therefore no water-repellent effect at all on the surface, and the water absorption too is unacceptably high. In the case of Paste 2, slightly better results are obtained owing to the polysiloxane content.

In the case of Cream S which contains 80% of active ingredient and is solvent-free and therefore not according to the invention, the accumulation of emulsifier and depletion of active ingredient result, on the surface, in hydrophobic characteristics which are poor on the surface and which manifest themselves in particular in an unacceptably poor water-repellency.

Example 7 (Imparting Water-Repellency to Concrete)

Creams 1 and 3 according to the invention are sprayed by the airless method, in an amount of about 200 g/m$^2$, onto concrete slabs (30×30×6 cm$^3$) of concrete quality class B 45 (compressive strength 45 N/mm$^2$), said slabs being set up perpendicularly. The creams form a white film on the concrete surface, which film disappears completely within about 2 hours. For comparison, two further concrete slabs were sprayed with low-viscosity impregnating compositions, that is to say one with an aqueous emulsion (abbreviation EM50) containing 50% of active ingredient (n-octyltriethoxysilane) and the other with a solution (abbreviation SO50) likewise containing 50% of active ingredient (1 part by weight of a polysiloxane of the (abbreviation SO50) likewise containing 50% of active ingredient (1 part by weight of a polysiloxane of the average formula $CH_3Si(OC_2H_5)_{0.80}O_{1.1}$, having a viscosity of 20 mm$^2$/s, 4 parts by weight of isooctyl-triethoxysilane). With dense spraying-on, a maximum product absorption of about 65 g/m$^2$ is achieved with the aqueous product EM50 and then absorption of about 80 g/m$^2$ with the solvent-containing product SO50. Higher application rates are not possible in one operation.

After impregnation, all test specimens were stored for 14 days at room temperature, after which the water absorption was determined with storage for 7 days in water (water level 5 cm above the test specimens). The test specimens were then broken, and the depth of penetration of the active ingredient was measured by dripping on water. Table III shows the results.

TABLE III

| Product | Water absorption | Depth of penetration | Surface change |
|---|---|---|---|
| Cream 1 | 0.08% | 5–7 mm | None |
| Cream 3 | 0.13% | 3–5 mm | Slight deepening of colour |
| EM50 | 0.67% | 0.5–1 mm | None |
| SO50 | 0.46% | 1–2 mm | Slight deepening of colour |
| Untreated | 1.21% | — | — |

As is evident from Table III, the two Creams 1 and 3 reduce the water absorption of the concrete substantially better than the low-viscosity products, owing to higher application rates and greater depth of penetration. The polysiloxane content of Cream 3 and SO50 leads to a slight deepening of colour on the dense concrete.

Example 8 (Priming of Concrete)

In each case 250 g/m$^2$ of Cream 1, and, for comparison, the same amount of Paste 1 were applied by means of a brush to mortar samples which had been produced according to DIN EN 196 T1 (water/cement ratio 0.5) and stored for at least 90 days under standard temperature and humidity conditions (DIN 50014; 23° C./50% relative humidity). After storage for 7 days at room temperature, the test specimens treated in this manner and untreated reference samples were brushed off with a coarse scrubbing brush and coated with an emulsion paint based on acrylic resin (StoCryl® V100, Sto AG, D-79780 Stühlingen). After drying, the adhesive strength of the paint was determined according to ISO 4624. Thereafter, the test specimens were broken and the depth of penetration of the hydrophobic active ingredient was determined by dripping on (Table IV).

TABLE IV

| Product | Adhesive strength | Depth of penetration |
|---|---|---|
| Cream 1 | -2.7 N/mm$^2$ | 8–10 mm |
| Paste 1 | 0.6 N/mm$^2$ | 7–10 mm |
| Untreated | 2.4 N/mm$^2$ | — |

As is evident from Table IV, the paint adhesion to the test specimens primed with Cream 1 is even higher than to the unimpregnated ones. In the case of priming with Paste 1, on the other hand, in spite of brushing off, water-repellent bentonite remains on the sample surface in an amount such that the paint adhesion is dramatically reduced. Paste 1 is consequently completely unsuitable for priming to impart water-repellency.

Example 9 (Cream Containing Solid)

2 g of emulsifier E2 are mixed with 79.5 g of water, 2 g of component N2 and 0.5 g of acetic acid, analogously to the preparation of Cream 4 in Example 3. 600 g of isoparaffin LM2 are then emulsified in this mixture in a high-speed stator/rotor stirring apparatus, the emulsion thus obtained already being considerably thickened. 77 g of a prepared mixture of 67 parts by weight of silane H1, 26 parts by weight of silicone resin H3 and 7 parts by weight of a silica-modified organopolysiloxane are then emulsified in portions in this already stiff phase. For the preparation of the silica-modified organopolysiloxane, 200 g of a finely divided hydrophobic silica (specific surface area of about 140 m²/g) are stirred uniformly into 800 g of organopolysiloxane H2 (→Cream 6: 10% of active ingredient, including silica).

Comparative Example (Solvent-Free Cream Containing Solid)

2 g of emulsifier E2 are mixed with 79.5 g of water, 2 g of component N2 and 0.5 g of acetic acid. 414 g of a prepared mixture of 67 parts by weight of silane H1, 26 parts by weight of silicone resin H3 and 7 parts by weight of a silica-modified organopolysiloxane are then emulsified in portions in this mixture in a high-speed stator/rotor stirring apparatus. For the preparation of the silica-modified organopolysiloxane, 200 g of a finely divided hydrophobic silica (specific surface area about 140 m²/g) are stirred uniformly into 800 g of organopolysiloxane.

Surprisingly, only a low-viscosity emulsion is obtained instead of a cream.

For comparison, the experiment is repeated, except that the original organopolysiloxane H2 is used instead of the silica-modified organopolysiloxane. In this experiment, a creamy consistency is obtained without problems.

Solvent-free creams are consequently not obtainable or not stable in the presence of finely divided hydrophobic silica.

Example 10 (Early Water Resistance)

Creams 4 and 6 according to the invention and the solvent-free comparative cream 5 are applied to clay bricks (about 22×10×7 cm³) by means of a brush in an amount of about 500 g/m². After 4 hours and after a drying time of 1 day at room temperature, water is dripped onto the bricks thus treated, and the wetting behaviour and the appearance of the surface are assessed qualitatively (Table V).

TABLE V

| Product | Wetting behaviour | | Surface change |
|---|---|---|---|
| | after 4 h | after 24 h | |
| Cream 4 | Wet to a great extent | Wet slightly | None |
| Cream 5 | Wet completely | Wet completely | None |
| Cream 6 | Good water-repellency | Very good water-repellency | None |

The results confirm that the hydrophobic silica of Cream 6 accumulates on the surface of the building material and produces pronounced water-repellency there immediately after penetration of the cream film. In the case of Creams 4 and 5, on the other hand, it is necessary for the silane or siloxane components H1, H2 and H3 to form a silicone resin network by reaction with moisture in order to give rise to water-repellency. This reaction takes substantially longer than 24 hours on the nonalkaline clay brick.

What is claimed is:

1. An aqueous, firm cream, comprising:
   A) one or more organosilicon compounds selected from
      A1) $C_{1-20}$-alkyl-$C_{2-6}$ alkoxysilanes, and
      A2) alkoxy-functional organopolysiloxanes;
   B) optionally, one or more organosilicon compound containing aminoalkyl groups, selected from
      B1) aminoalkyl group-containing alkoxysilanes,
      B2) Si—C bonded, aminoalkyl group-containing organopolysiloxanes having an amine number of at least 0.01;
   C) one or more emulsifiers;
   D) one or more organic solvents immiscible with water, in an amount of 1 to about 95% by weight based on the total weight of the aqueous, firm cream; and
   E) optionally a finely divided, water-repellant silica, wherein the amount of components A) and B) totals from 1 to 80 weight percent based on the total weight of the cream.

2. The cream of claim 1, wherein the sum of components A) and B) is from 5 to 50 weight percent based on the total weight of the cream.

3. The cream of claim 1, wherein said organic solvent is present in an amount of 5 to 80% by weight based on the total weight of the cream.

4. The cream of claim 2, wherein said organic solvent is present in an amount of 5 to 80% by weight based on the total weight of the cream.

5. The cream of claim 1, wherein said water repellant silica is a hydrophobicized silica having a BET surface area of 40 m²/g or more, present in an amount of 0.01 to 4 weight percent based on the total weight of the cream.

6. The cream of claim 1, wherein the $C_{1-20}$-alkyl-$C_{2-6}$-alkoxysilanes (A1) have one or two identical or different, optionally halogen-substituted, monovalent $C_{1-20}$-alkyl radicals bonded via SiC, and the remaining radicals are identical or different $C_{2-6}$-alkoxy radicals.

7. The cream of claim 2, wherein the $C_{1-20}$-alkyl-$C_{2-6}$-alkoxysilanes (A1) have one or two identical or different, optionally halogen-substituted, monovalent $C_{1-20}$-alkyl radicals bonded via SiC, and the remaining radicals are identical or different $C_{2-6}$-alkoxy radicals.

8. The cream of claim 3, wherein the $C_{1-20}$-alkyl-$C_{2-6}$-alkoxysilanes (A1) have one or two identical or different, optionally halogen-substituted, monovalent $C_{1-20}$-alkyl radicals bonded via SiC, and the remaining radicals are identical or different $C_{2-6}$-alkoxy radicals.

9. The cream of claim 1, in which the organopolysiloxanes (A2) comprise units of the general formula (I)

$$R_x Si(OR^1)_y Si(OH)_z O_{\frac{4-x-y-z}{2}} \quad (I)$$

in which

R are identical or different monovalent, optionally halogen-substituted $C_{1-20}$-hydrocarbon radicals bonded via SiC, $R^1$ are identical or different monovalent $C_{1-6}$-alkyl radicals, x is 0, 1, 2 or 3, on average 0.8 to 1.8, y is 0, 1, 2 or 3, on average 0.01 to 2.0, and z is 0, 1, 2 or 3, on average 0.0 to 0.5, with the proviso that the sum of x, y and z is not more than 3.5.

10. The cream of claim 2, in which the organopolysiloxanes (A2) consist of units of the general formula (I)

$$R_xSi(OR^1)_ySi(OH)_zO_{\frac{4-x-y-z}{2}} \quad (I)$$

in which

R are identical or different monovalent, optionally halogen-substituted $C_{1-20}$-hydrocarbon radicals bonded via SiC, $R^1$ are identical or different monovalent $C_{1-6}$-alkyl radicals, x is 0, 1, 2 or 3, on average 0.8 to 1.8, y is 0, 1, 2 or 3, on average 0.01 to 2.0, and z is 0, 1, 2 or 3, on average 0.0 to 0.5, with the proviso that the sum of x, y and z is not more than 3.5.

11. The cream of claim 3, in which the organopolysiloxanes (A2) consist of units of the general formula (I)

$$R_xSi(OR^1)_ySi(OH)_zO_{\frac{4-x-y-z}{2}} \quad (I)$$

in which

R are identical or different monovalent, optionally halogen-substituted $C_{1-20}$-hydrocarbon radicals bonded via SiC, $R^1$ are identical or different monovalent $C_{1-6}$-alkyl radicals, x is 0, 1, 2 or 3, on average 0.8 to 1.8, y is 0, 1, 2 or 3, on average 0.01 to 2.0, and z is 0, 1, 2 or 3, on average 0.0 to 0.5, with the proviso that the sum of x, y and z is not more than 3.5.

12. The cream of claim 1, in which the organopolysiloxanes (B1) are present and comprise units of the general formula (III)

$$R^2_aR^3_b(OR^4)_cSiO_{\frac{4-a-b-c}{2}} \quad (III)$$

in which $R^2$ are identical or different monovalent, optionally halogen-substituted, SiC-bonded $C_{1-20}$hydrocarbon radicals free of basic nitrogen, $R^3$ are identical or different monovalent, optionally halogen-substituted SiC-bonded $C_{1-30}$hydrocarbon radicals having basic nitrogen, $R^4$ are identical or different and are a hydrogen atom or $C_{1-6}$-alkyl radicals, a is 0, 1, 2 or 3, b is 0, 1, 2 or 3, on average at least 0.05, and c is 0, 1, 2 or 3, with the proviso that the sum of a, b and c is less than or equal to 3 and that the amine number of the organopolysiloxane (B2) is at least 0.01.

13. The cream of claim 2, in which the organopolysiloxanes (B1) are present and comprise units of the general formula (III)

$$R^2_aR^3_b(OR^4)_cSiO_{\frac{4-a-b-c}{2}} \quad (III)$$

in which $R^2$ are identical or different monovalent, optionally halogen-substituted, SiC-bonded $C_{1-20}$-hydrocarbon radicals free of basic nitrogen, $R^3$ are identical or different monovalent, optionally halogen-substituted SiC-bonded $C_{1-30}$ -hydrocarbon radicals having basic nitrogen, $R^4$ are identical or different and are a hydrogen atom or $C_{1-6}$-alkyl radicals, a is 0, 1, 2 or 3, b is 0, 1, 2 or 3, on average at least 0.05, and c is 0, 1, 2 or 3, with the proviso that the sum of a, b and c is less than or equal to 3 and that the amine number of the organopolysiloxane (B2) is at least 0.01.

14. The cream of claim 2, in which the organopolysiloxanes (B1) are present and comprise units of the general formula (III)

$$R^2_aR^3_b(OR^4)_cSiO_{\frac{4-a-b-c}{2}} \quad (III)$$

in which $R^2$ are identical or different monovalent, optionally halogen-substituted, SiC-bonded $C_{1-20}$-hydrocarbon radicals free of basic nitrogen, $R^3$ are identical or different monovalent, optionally halogen-substituted SiC-bonded $C_{1-30}$-hydrocarbon radicals having basic nitrogen, $R^4$ are identical or different and are a hydrogen atom or $C_{1-6}$-alkyl radicals, a is 0, 1, 2 or 3, b is 0, 1, 2 or 3, on average at least 0.05, and c is 0, 1, 2 or 3, with the proviso that the sum of a, b and c is less than or equal to 3 and that the amine number of the organopolysiloxane (B2) is at least 0.01.

15. The cream of claim 1, in which the alkoxysilanes (B1) containing aminoalkyl groups have the general formula (II)

$$R^2_uR^3_vSi(OR^4)_{4-u-v} \quad (II)$$

in which $R^2$ are identical or different monovalent, optionally halogen-substituted, SiC-bonded $C_{1-20}$-hydrocarbon radicals free of basic nitrogen, $R^3$ are identical or different monovalent, optionally halogen-substituted SiC-bonded $C_{1-30}$-hydrocarbon radicals having basic nitrogen, $R^4$ are identical or different and are a hydrogen atom or $C_{1-6}$-alkyl radicals, u is 0, 1 or 2, and v is 1, 2 or 3, with the proviso that the sum of u and v is less than or equal to 3.

16. The cream of claim 2, in which the alkoxysilanes (B1) containing aminoalkyl groups have the general formula (II)

$$R^2_uR^3_vSi(OR^4)_{4-u-v} \quad (II)$$

in which $R^2$ are identical or different monovalent, optionally halogen-substituted, SiC-bonded $C_{1-20}$-hydrocarbon radicals free of basic nitrogen, $R^3$ are identical or different monovalent, optionally halogen-substituted SiC-bonded $C_{1-30}$hydrocarbon radicals having basic nitrogen, $R^4$ are identical or different and are a hydrogen atom or $C_{1-6}$-alkyl radicals, with the proviso that the sum of u and v is less than or equal to 3.

17. The cream of claim 3, in which the alkoxysilanes (B1) containing aminoalkyl groups have the general formula (II)

$$R^2{}_u R^3{}_v Si(OR^4)_{4-u-v} \quad (II)$$

in which

R$^2$ are identical or different monovalent, optionally halogen-substituted, SiC-bonded C$_{1-20}$-hydrocarbon radicals free of basic nitrogen, R$^3$ are identical or different monovalent, optionally halogen-substituted SiC-bonded C$_{1-30}$-hydrocarbon radicals having basic nitrogen, R$^4$ are identical or different and are a hydrogen atom or C$_{1-6}$-alkyl radicals, u is 0, 1 or 2, and v is 1, 2 or 3, with the proviso that the sum of u and v is less than or equal to 3.

18. The cream of claim 1, wherein the emulsifier comprises one or more of alkyl polyglycol ethers, polyoxyalkylated alkylamines, alkylpolyglycosides, or polyvinyl alcohols.

19. The cream of claim 1, wherein said organic solvent comprises one or more of alkane solvents, petroleum hydrocarbons, isoparaffins, long chain alcohols, and ethers.

20. A process for impregnating or priming mineral building materials to impart water-repellency, comprising applying to the building material the aqueous cream of claim 1.

* * * * *